United States Patent
So et al.

(10) Patent No.: US 9,513,143 B2
(45) Date of Patent: Dec. 6, 2016

(54) COMBINED RADIAL POSITION AND SPEED SENSOR ASSEMBLY

(71) Applicant: SKF Magnetic Bearings, a Unit of SKF Canada Limited, Calgary (CA)

(72) Inventors: Udell So, Calgary (CA); Bertrand Barbey, Calgary (CA); Matthew A. Nesbitt, Calgary (CA); Luc Baudelocque, Saint Marcel (FR); Ulrich Schroder, Saint Marcel (FR)

(73) Assignee: SKF CANADA LIMITED, Scarborough, Ontario (CA)

( * ) Notice: Subject to any disclaimer, the term of this patent is extended or adjusted under 35 U.S.C. 154(b) by 69 days.

(21) Appl. No.: 14/675,094

(22) Filed: Apr. 23, 2015

(65) Prior Publication Data

US 2016/0313143 A1    Oct. 27, 2016

(51) Int. Cl.
   *G01B 7/30*    (2006.01)
   *G01D 5/20*    (2006.01)
   *G01P 3/44*    (2006.01)
   *G01D 5/12*    (2006.01)

(52) U.S. Cl.
   CPC .............. *G01D 5/2053* (2013.01); *G01D 5/12* (2013.01); *G01D 5/2013* (2013.01); *G01P 3/44* (2013.01)

(58) Field of Classification Search
   CPC ............ G01D 5/12; G01D 5/2013; G01P 3/44
   USPC ............................................. 324/207.25, 160
   See application file for complete search history.

(56) References Cited

U.S. PATENT DOCUMENTS

| | | | | |
|---|---|---|---|---|
| 4,356,447 A | * | 10/1982 | Honig | F02P 7/061 324/169 |
| 6,320,288 B1 | * | 11/2001 | Suzuki | H02K 29/08 310/67 R |
| 2013/0009631 A1 | * | 1/2013 | Tsuge | G01D 5/2046 324/207.18 |

* cited by examiner

*Primary Examiner* — Reena Aurora
(74) *Attorney, Agent, or Firm* — Mark Ussai; SKF USA Inc. Patent Dept.

(57) ABSTRACT

A sensor assembly includes an annular target body disposed about a rotatable member outer surface and an annular angular position indicator with at least one angular position index corresponding to an angular position of the member. Radial displacement sensors are spaced circumferentially about the axis and radially outwardly from the target body outer surface. A reference sensor is disposed circumferentially between two of the radial displacement sensors, has an inner end spaced outwardly from the target body surface by a first spacing distance, and is configured to detect the target body. An angular displacement sensor is spaced axially from the reference sensor and has an inner end spaced outwardly from the position indicator surface by a second spacing distance. The angular sensor is located such that the second spacing distance is generally equal to the first spacing distance and such that the position index passes the sensor inner end.

16 Claims, 14 Drawing Sheets

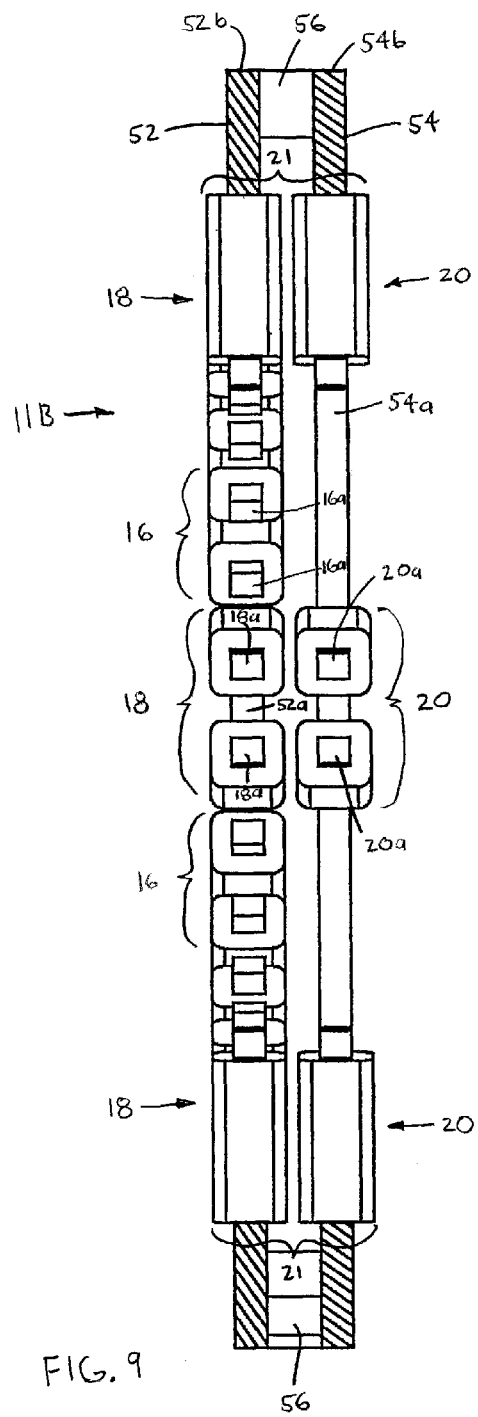
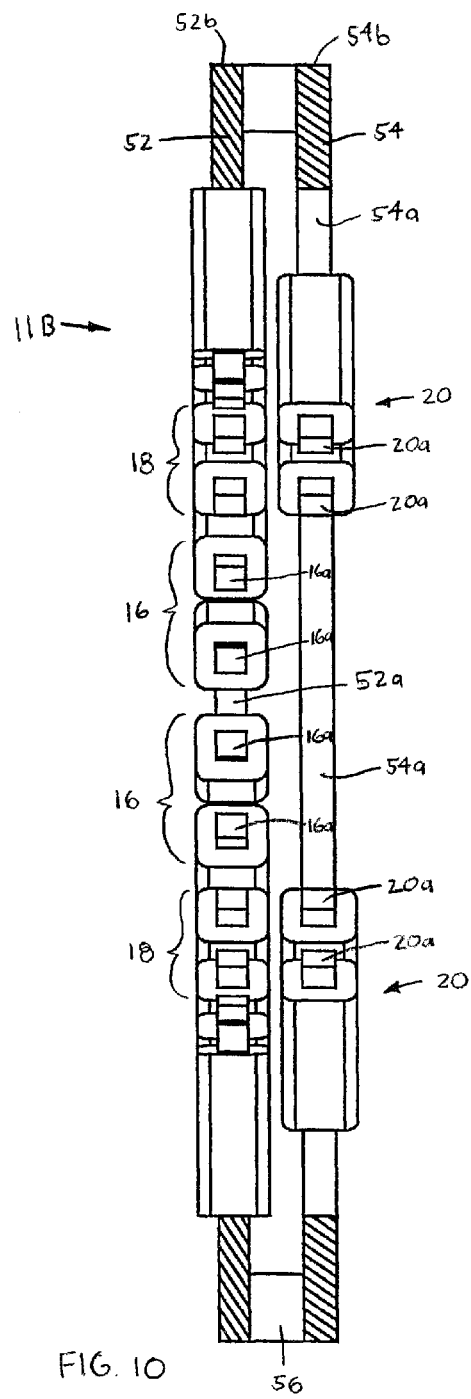
FIG. 9
FIG. 10

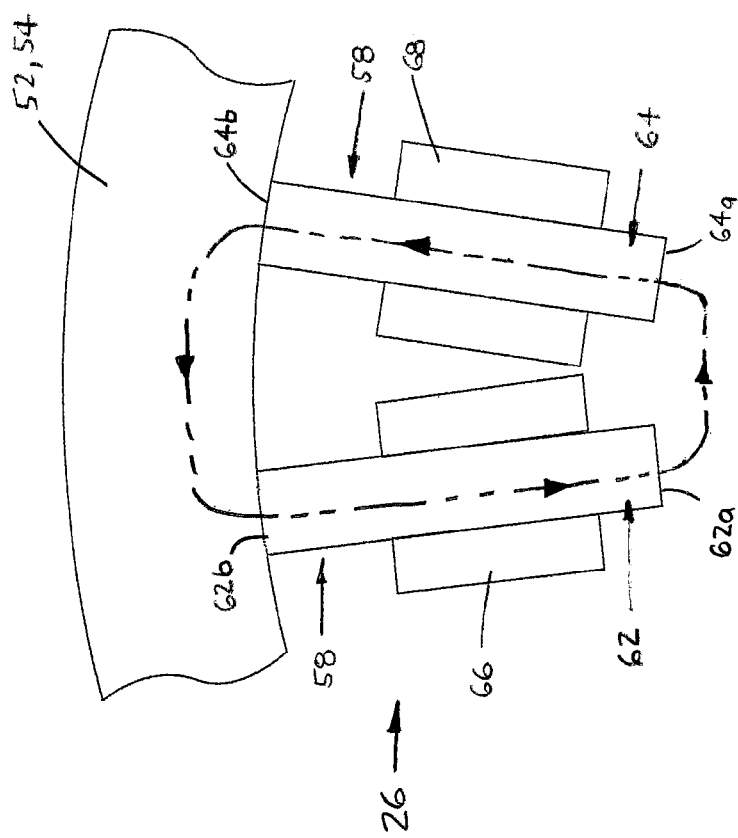

COMBINED RADIAL POSITION AND SPEED SENSOR ASSEMBLY

BACKGROUND OF THE INVENTION

The present invention relates to sensors, and more particularly to speed sensors for rotatable members such as shafts.

Sensors for determining angular displacement or speed of rotatable members are known. Often, such sensors are inductive sensors which detect ferromagnetic material, or the absence of such materials, on the rotatable member or a member (e.g., a sleeve) disposed about the member so as to determine angular displacement and thereby speed. However, when the rotatable member displaces radially with respect to its axis of rotation, the sensors may provide a false indication of angular position, which causes error in the speed measurement.

Referring to FIGS. 18-20, one prior art sensor assembly known for at least several years is formed as a combination of sensors for determining radial displacement with respect to a central axis of rotation A and sensors for determining axial displacement along the rotation axis A. Such a sensor assembly may include a plurality of radial displacement sensors SR and a plurality of axial displacement sensors SA, such as for example, eight of each as shown in FIGS. 18 and 21 in a preferred arrangement. Preferably, the eight preferred radial sensors SR are spaced apart circumferentially about a shaft or other member being monitored and the eight preferred axial sensors SA are arranged in four sensor pairs PS (FIG. 20) spaced circumferentially apart about the shaft. Each sensor pair PS includes two axially spaced apart axial sensors SA, such that four axial sensors SA are located on each axial side of the "circle" of radial sensors SR. Further, all four axial sensors SA on each side of the radial sensors SR are wired in series with each other and a separate one of two oscillators for driving the sensors SA, or the same oscillator for driving the sensors SA and SR, as depicted in FIG. 21. As will be apparent to those skilled in sensor technology, the described spacing arrangement and coil combination allows the radial sensors to substantially reject the second and third harmonics of the target and their multiples, and the axial sensors to substantially reject the second harmonic of the target.

As best shown in FIG. 18, in the preferred prior art sensor assembly described above, each one of the plurality of radial and axial sensors SR, SA is preferably an inductance sensor that includes two core members each wound with a separate coil and arranged such that magnetic flux passes out of the end of one core member and into an adjacent end of the other core member (not indicated). Further, the prior art sensor assembly also includes a combined radial/axial sensor target disposed on a shaft and consisting of a ferromagnetic annular member TF disposed axially between a pair of nonferromagnetic annular members TN, as shown in FIGS. 19 and 20. The radial sensors SR are positioned to sense the central portion of the ferromagnetic target member TF and the two axial sensors SA of each sensor pair PS are positioned such that each sensor SA detects a separate one of two opposing axial sides L and R of the ferromagnetic member TF, as shown in FIG. 20.

SUMMARY OF THE INVENTION

In one aspect, the present invention is a sensor assembly for sensing radial position and speed of a rotatable member, the member being rotatable about a central axis and having an outer surface extending circumferentially about the axis. The sensor assembly comprises a generally annular target body disposed about the rotatable member outer surface and having a substantially continuous outer circumferential surface. A generally annular angular position indicator having an outer circumferential surface and at least one angular position index corresponding to a particular angular position of the member with respect to the central axis, the angular position indicator being one of integrally formed with the target body and spaced axially from the target body. A plurality of radial position sensors are spaced circumferentially about the axis, each sensor being spaced radially outwardly from the target body outer surface and configured to sense radial displacement of the target body with respect to the central axis. Further, a reference sensor is disposed circumferentially between two of the radial position sensors, has an inner end spaced radially outwardly from the target body outer surface by a first spacing distance, and is configured to detect the target body. Furthermore, an angular displacement sensor is spaced axially from the reference sensor and has an inner end spaced radially outwardly from the angular position indicator outer surface by a second spacing distance. The angular displacement sensor is located such that the second spacing distance is generally equal to the first spacing distance and such that the angular position index passes between the angular displacement sensor inner end and the central axis during rotation of the rotatable member.

In another aspect, the present invention is again a sensor assembly for sensing radial position and speed of a shaft rotatable about a central axis. The sensor assembly comprises a plurality of radial position inductive sensors spaced circumferentially about the axis, each radial position sensor being spaced radially outwardly from the shaft and configured to sense radial displacement of the shaft with respect to the central axis. A reference inductive sensor is disposed circumferentially between two of the radial position sensors and has an inner end spaced radially outward from a target surface extending circumferentially about the central axis, the target surface being provided by the shaft or an annular indicator body disposed on the shaft. An angular position index is provided by the shaft or an annular position indicator disposed about the shaft. An angular displacement inductive sensor is spaced axially from the reference sensor and has an inner end. The angular displacement sensor is located such that a radial spacing distance between the angular displacement sensor inner end and an outer surface of the shaft or the annular indicator body is about equal to a radial spacing distance between the reference sensor inner end and the target surface. The angular displacement sensor is also located such that the angular position index passes generally between the angular displacement sensor inner end and the central axis during rotation of the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 9 is view through line 9-9 of FIG. 8;

FIG. 10 is a view through line 10-10 of FIG. 8;

FIG. 15 is an enlarged plan view of a portion of a base plate of the sensor assembly, showing two integral projections providing the two core members of a preferred sensor;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the word "connected" is intended to include direct connections between two members without any other members interposed therebetween, indirect connections between members in which one or more other members are interposed therebetween, and operative connections. The terminology includes the words specifically mentioned above, derivatives thereof, and words of similar import.

Figure 1:
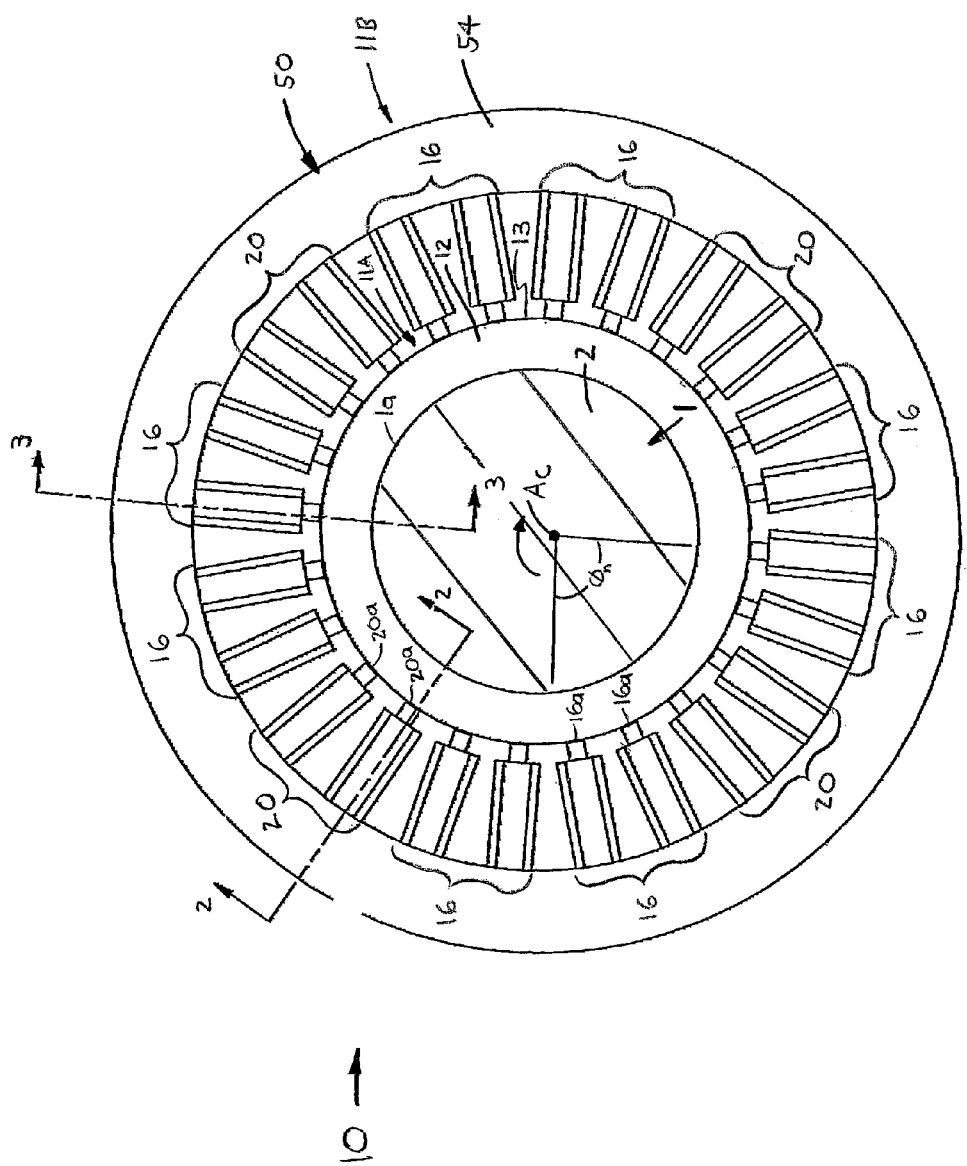
FIG. 1 is front plan view of a sensor assembly in accordance with the present invention, shown mounted on a shaft in cross-section.
Figure 3:
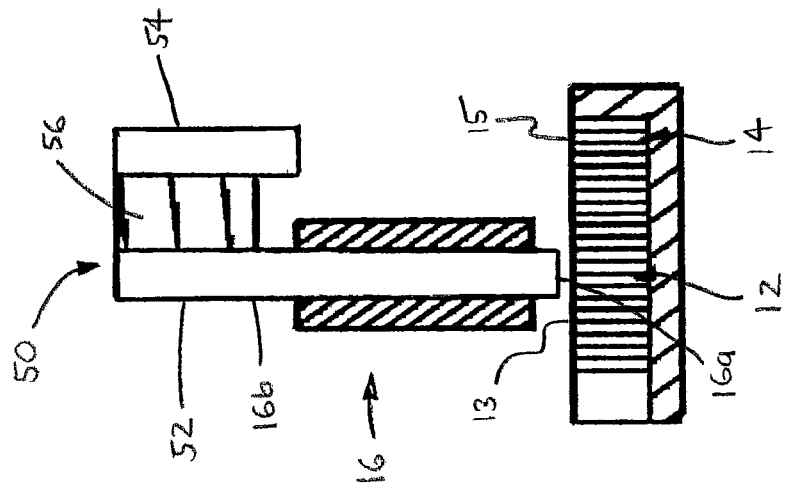
FIG. 3 is an enlarged, radial cross-sectional view through line 3-3 of FIG. 1, showing a radial displacement sensor.
Figure 2:
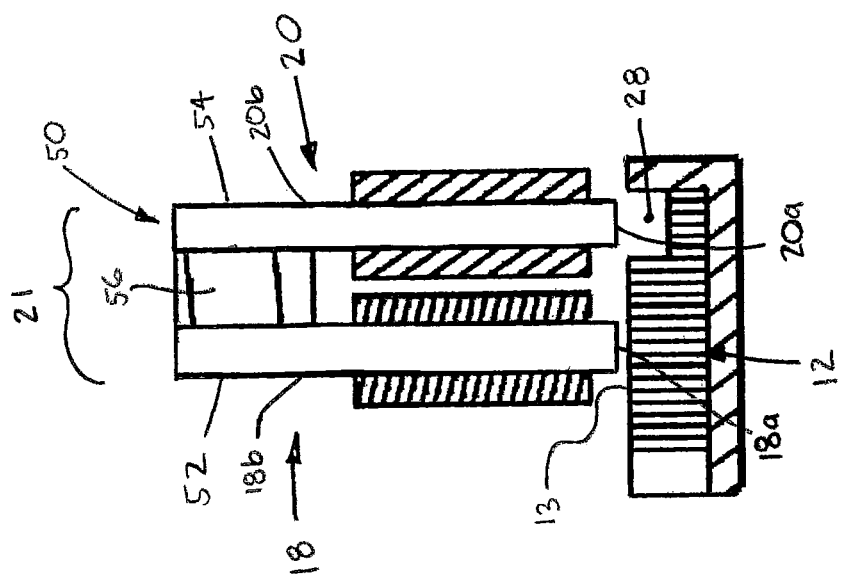
FIG. 2 is an enlarged, radial cross-sectional view through line 2-2 of FIG. 1, showing a reference sensor and speed sensor.
Figure 4:
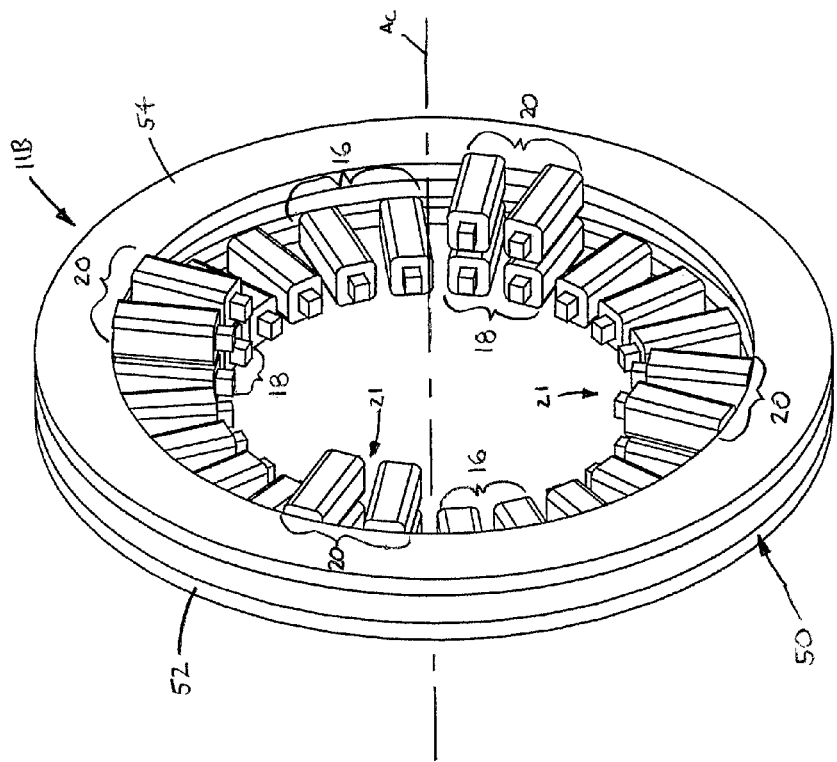
FIG. 4 is a perspective view of the sensor assembly.
Figure 5:
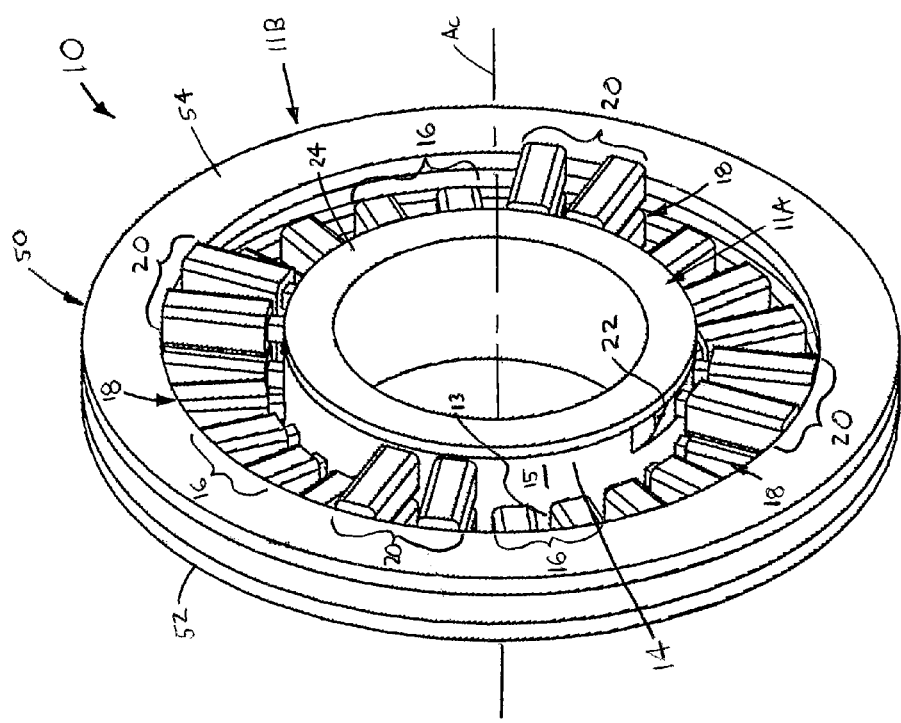
FIG. 5 is a perspective view of a fixed, outer subassembly of the sensor assembly.
Figure 7:
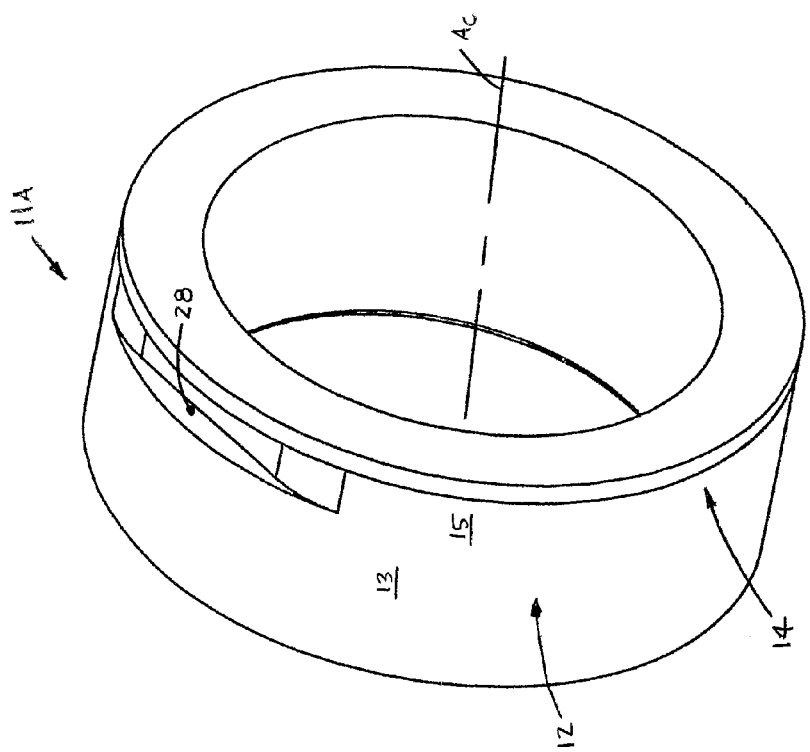
FIG. 7 is a perspective view of a second construction of a rotatable inner subassembly of the sensor assembly, showing an angular position indicator integral with the target body and having an air gap position index.
Figure 6:
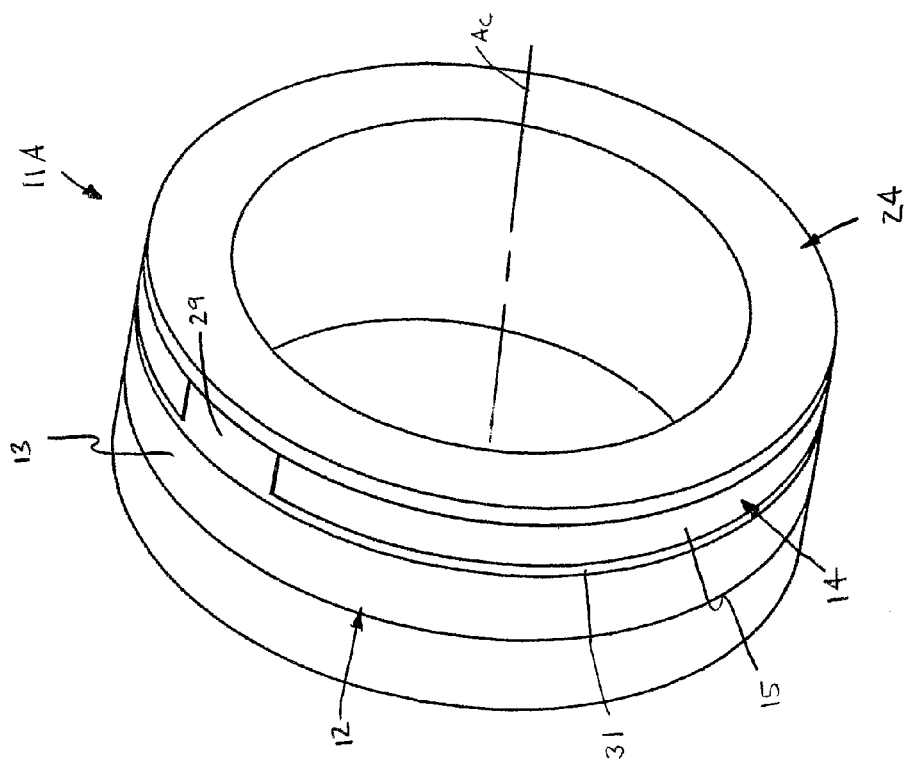
FIG. 6 is a perspective view of a first construction of a rotatable inner subassembly of the sensor assembly, showing an angular position indicator separate from a target body and having a nonferromagnetic index portion.
Figure 8:
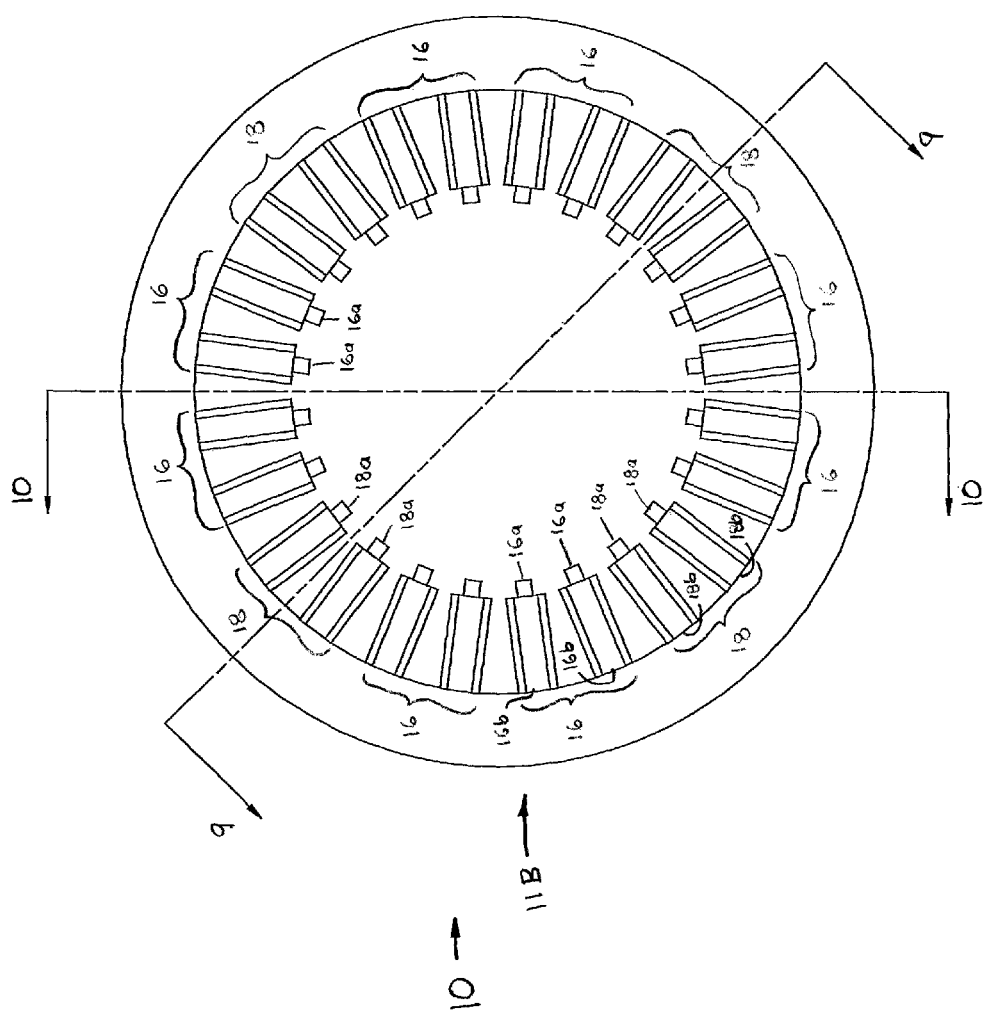
FIG. 8 is a front plan view of the fixed, outer subassembly of the sensor assembly.

Referring now to the drawings in detail, wherein like numbers are used to indicate like elements throughout, there is shown in FIGS. 1-17 a sensor assembly 10 for sensing radial position and speed of a rotatable member 1 (FIG. 1), such as a generally circular cylindrical shaft 2, the member 1 being rotatable about a central axis $A_C$ and having an outer surface 1a extending circumferentially about the axis $A_C$. The sensor assembly 10 basically comprises a generally annular target body 12, a generally annular angular position indicator 14, a plurality of radial displacement sensors 16 spaced circumferentially about the central axis $A_C$, a reference sensor 18 and an angular position sensor 20. The annular target body 12 is disposed about the rotatable member outer surface 1a and has a substantially continuous outer circumferential surface 13. The annular position indicator 14 has an outer circumferential surface 15 and at least one angular position index 22 corresponding to a particular angular position $\theta_n$ of the member 1 with respect to the central axis $A_C$. Although preferably formed as a separate annular body 24 spaced axially from the target body 12, which together form a fixed inner subassembly 11A, as shown in FIG. 6, the angular position indicator 14 may be integrally formed with the target body 12 as depicted in FIG. 7. Further, each radial displacement sensor 16 is spaced radially outwardly from the target body outer surface 13 and is configured to sense radial displacement of the target body 12, and thus the rotatable member 1, with respect to the central axis $A_C$.

Figure 11:
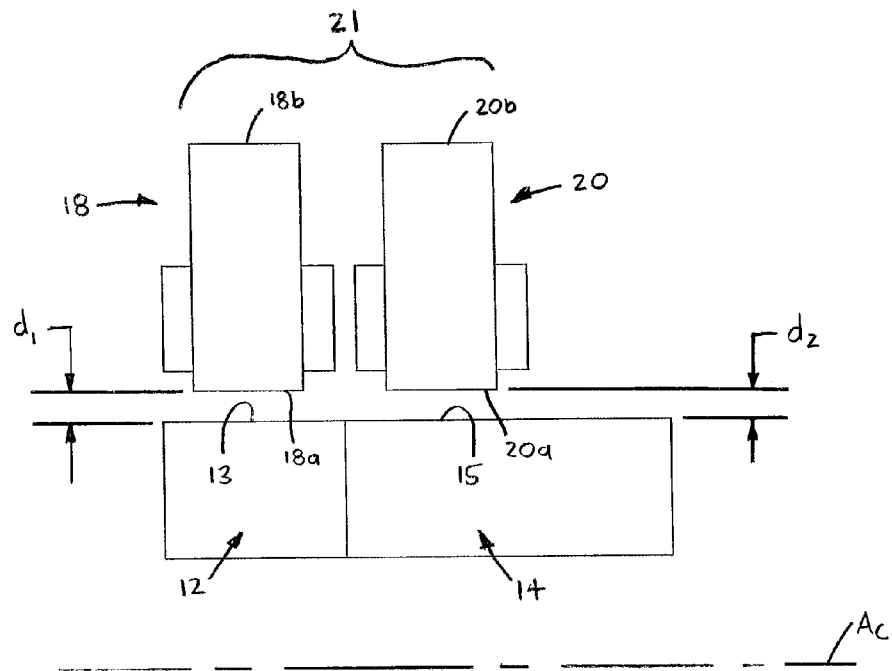
FIG. 11 is a more diagrammatic view of a reference sensor and an angular displacement sensor, showing the displacement sensor detecting the outer surface of the angular position indicator when the displacement sensor is not aligned with the air gap position index (not shown in this view)
Figure 12:
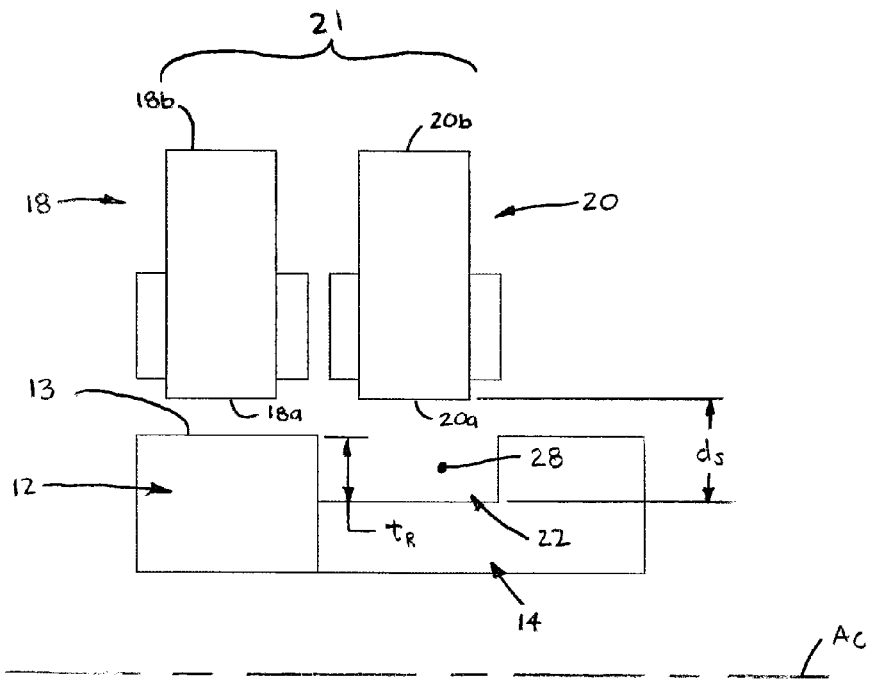
FIG. 12 is another more diagrammatic view of a reference sensor and an angular displacement sensor, showing the displacement sensor detecting an air gap position index of the angular position indicator.

Furthermore, the reference sensor 18 is disposed circumferentially between two of the radial position sensors 16 and has opposing radially inner and outer ends 18a, 18b, respectively. The reference sensor inner end 18a is spaced radially outwardly from the target body outer surface 13 by a first spacing distance $d_1$ (FIG. 11), the sensor 18 being configured to detect the target body 12. Also, the angular displacement sensor 20 is spaced axially from the reference sensor 18 and has opposing radially inner and outer ends 20a, 20b, respectively, as best shown in FIG. 11. The angular displacement sensor inner end 20a is spaced radially outwardly from the angular position indicator outer surface 15 by a second spacing distance $d_2$ (FIG. 11). The angular displacement sensor 20 is located or arranged such that the second spacing distance $d_2$ is generally equal to the first spacing distance $d_1$ and such that the angular position index 22 passes between the displacement sensor inner end 20a and the central axis $A_C$ during rotation of the rotatable member 1 (see, e.g., FIG. 12). Such a relative arrangement of the reference sensor 18 and angular displacement sensor 20 enables the outputs of the reference sensor 18 and the angular displacement sensor 20 to be electrically combined, such that the combination is substantially or entirely immune to or unchanged by radial movement/displacement of the rotatable member 1, as described in detail below.

Figure 13:
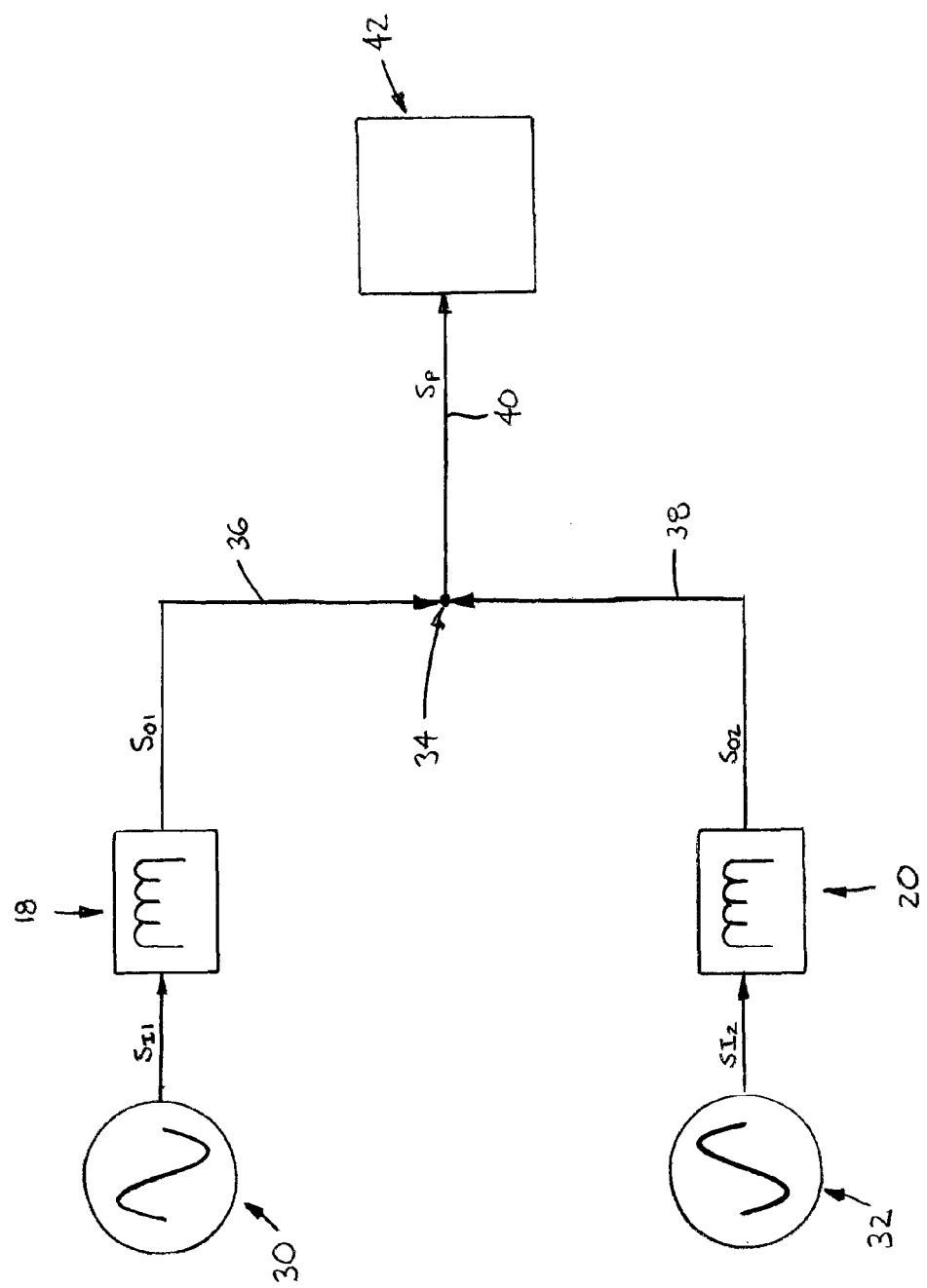
FIG. 13 is a schematic diagram of certain electronic components of the sensor assembly.

Preferably, each one of the reference sensor 18 and the angular position sensor 20 is an inductive sensor 26 and both of the target body 12 and the angular position indicator body 14 are formed of a ferromagnetic, laminated or non-laminated material. Also, the angular position index 22 is either provided by a generally arcuate air gap 28 (FIGS. 2, 7 and 12) or an arcuate portion 29 formed of a non-ferromagnetic material, which is preferably integrally attached to a nonferromagnetic spacer plate 31 separating the target body 12 and the position indicator 14 (see FIG. 6). The reference sensor 18 is configured to generate an output signal $S_{O1}$ proportional to the first spacing distance $d_1$ and the angular displacement sensor 20 is configured to generate an output signal $S_{O2}$ generally proportional to the second spacing distance $d_2$, as indicated in FIG. 13. Thus, the output signals $S_{O1}$, $S_{O2}$ from each inductive sensor 26 that provides one of the sensors 18, 20 generally have substantially equal amplitudes due to the substantially equal spacing distances $d_1$, $d_2$ between the body outer surfaces 13, 15 and the sensor inner ends 18a, 20a. However, when the angular position index 22 passes between the angular displacement sensor inner end 20a and the central axis $A_C$ during rotation of the rotatable member 1, a pulse in the displacement sensor output signal $S_{O2}$ is formed.

Referring specifically to FIG. 13, with the preferred inductive sensors 26, the sensor assembly 10 preferably further comprises first and second oscillator circuits 30, 32, respectively, and an interconnection 34. The first oscillator circuit 30 is electrically connected with the reference sensor 18 and is configured to provide a first input signal $S_{I1}$ to the sensor 18. The second oscillator circuit 32 is electrically connected with the angular position sensor 20 and is configured to provide a second input signal $S_{I2}$ to the sensor 20. The oscillator circuits 30, 32 are arranged or configured such that the second input signal $S_{I1}$ is about one hundred eighty degrees) (180°) out-of-phase of the first input signal $S_{I2}$; correspondingly, the sensor output signals $S_{O1}$, $S_{O2}$ will also be about one hundred eighty degrees (180°) out-of-phase of each other. Further, the interconnection 34 is electrically connected with the reference sensor 18 and with the angular displacement sensor 20 so as to receive the output signals $S_{O1}$, $S_{O2}$. Preferably, the interconnection 34 includes a first wire 36 electrically coupled with the reference sensor 18 and receiving the first sensor output signal $S_{O1}$ and a second wire 38 connected with the angular displacement sensor 20 and receiving the second sensor output signal $S_{O2}$. A third wire 40 is connected with each one of the first and second wires 36, 38 and receives both of the first and second signals $S_{O1}$, $S_{O2}$ from each one of the two sensors 18, 20, and transmits an output signal to a processor 42, as described below.

Furthermore, the interconnection 34 is preferably configured to combine the output signals $S_{O1}$, $S_{O2}$ from the two sensors 18, 20 such that the sensor output signals $S_{O1}$, $S_{O2}$ cancel each other when the first spacing distance $d_1$ is generally equal to the second spacing distance $d_2$ and is configured to transmit a pulse output signal $S_P$ when receiving a pulse from the angular position sensor 20. In other words, the two out-of-phase sensor signals $S_{O1}$, $S_{O2}$ have the same amplitude when the angular displacement sensor 20 senses the indicator outer surface 15, such that the combination of the two signals $S_{O1}$, $S_{O2}$ results in a zero output signal from the interconnection 34. However, when the angular position index 22 passes by the angular displacement sensor inner end 20a, the "sensing distance" or the distance $d_S$ (FIG. 12) between the sensor inner end 20a and the most proximal ferromagnetic material, temporarily increases to a value equal to the second spacing distance $d_2$ plus the radial thickness $t_R$ of the air gap 28 or the non-ferromagnetic material portion 29 (i.e., $d_S=d_2+t_R$). The increase in the sensing distance $d_S$ increases the amplitude of the angular displacement sensor output signal $S_{O2}$ and creates the pulse $P_A$, such that the combination of the two sensor signals $S_{O1}$, $S_{O2}$ results in a net or pulse output signal $S_P$ from the interconnection 34, as indicated in FIG. 13.

With the above arrangement, the output signal from the interconnection 34 has a zero value or a base value which does not change when the angular displacement sensor 20 is sensing the outer surface 15 of the angular position indicator 14, regardless of any radial displacement of the rotatable member 1. In other words, any radial displacement of the rotatable member 1 increases (or decreases) each spacing distance $d_1$, $d_2$ by an equal amount, such that output signals $S_{O1}$, $S_{O2}$ from each sensor 18, 20 have the same amplitude and cancel each other in the circuit 34. Thus, the interconnection 34 has a pulse output signal $S_P$ only when the angular displacement sensor 20 senses the gap or nonferromagnetic portion (i.e., and generates a pulse $P_A$), indicating that the rotatable member 1 is at a particular angular position relative to the central axis $A_C$. Therefore, the sensor assembly 10 is substantially incapable of providing a false measurement of rotatable member angular position $\theta_n$, and thus speed, caused by radial displacement of the member 1.

Figure 14:
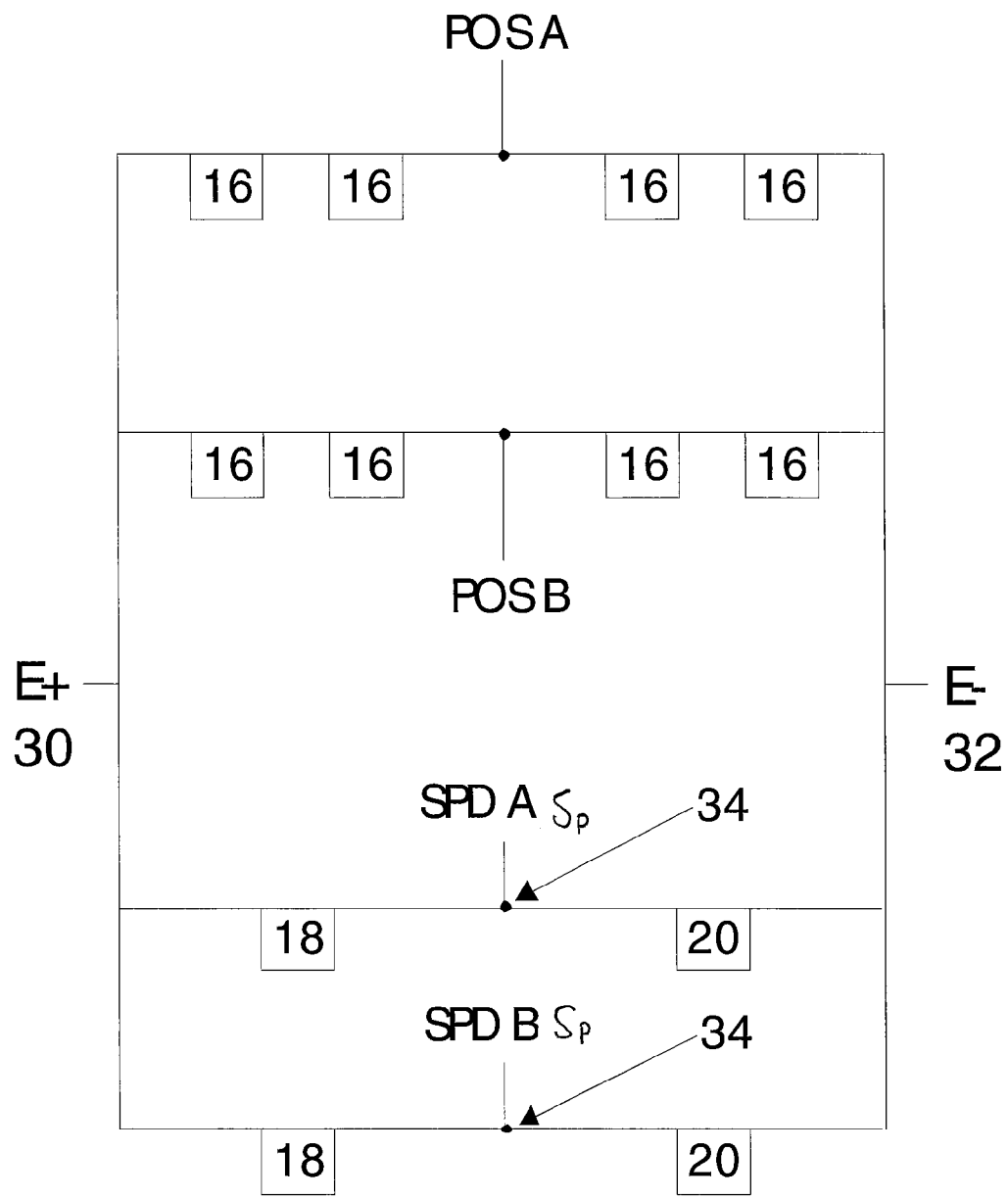
FIG. 14 is a more detailed schematic diagram of the interconnection of sensors and oscillators in one embodiment of the present invention.

Still referring to FIG. 13, as mentioned above, the sensor assembly 10 preferably further comprises a processor 42 electrically connected with the interconnection 34 so as to receive the output signal $S_P$ from the circuit 34. The processor 42 is configured, i.e., wired or programmed, to determine the angular position, angular displacement and/or rotational speed of the rotatable member 1 or shaft 2. Most preferably, the processor 42 is a digital processor configured to count the output pulses $S_P$ and compare the pulses with a time parameter (i.e., from a clock circuit) to determine speed of the rotatable member 1. Specifically, depending on the number of angular position indices 22, a number of pulses $S_P$ will be generated per revolution, for example, one pulse $S_P$ per revolution for a single angular position index 22 and a single angular displacement sensor 20, two pulses $S_P$ for two position indices 22 and a single sensor 20, four pulses $S_P$ for two position indices 22 and two sensors 20, etc. By comparing the number of pulses $S_P$ per a specified time period, the processor 42 calculates the rotational speed of the member/shaft 1. Further, the processor 42 is preferably electrically coupled with each of the radial position sensors 16 and is further configured to determine radial displacement of the rotatable member 1 with respect to the central axis $A_C$ using output from the sensors 16. Referring specifically to FIG. 14, a presently preferred wiring configuration of the sensors 16, 18 and 20, the interconnection 34 and the oscillator circuits 30, 32 is depicted, which shows an arrangement in which the oscillator circuits 30, 32 "drive" the radial position sensors 16, the reference sensors 18 and the angular position sensors 20. Alternatively, additional, separate oscillator circuits (none shown) may be provided to provide input signals to the radial displacement sensors 16 separate from the other sensors 18, 20 (arrangement not shown).

Referring now to FIGS. 1, 4, 5, 8-10 and 15-17, the sensor assembly 10 preferably includes at least one generally annular base member 50 disposable within a housing (not shown) and configured to support each one of the radial position sensors 16, the reference sensor(s) 18 and the angular displacement sensor(s) 20, which collectively form an outer subassembly 11B. Most preferably, the base member 50 is constructed of first and second generally annular plates 52, 54 each fabricated of a ferromagnetic material, spaced axially apart and separated by a plurality of spacers 56. Each base plate 52, 54 has opposing inner and outer surfaces 52a, 52b and 54a, 54b, respectively, each sensor 16, 18 and 20 extending radially inwardly from the inner surface 52a, 54a of one of the base plates 52, 54. More specifically, the first base plate 52 preferably includes a plurality of elongated projections or teeth 58 (FIG. 15) extending radially inwardly from the plate inner surface 52a and spaced circumferentially about the central axis $A_C$. The projections 58 are arranged in pairs that each form a separate radial position sensor 16 and at least one, and most preferably four, reference sensors 18 as described in further detail below. Also, the second base plate 54 includes at least one pair of elongated projections/teeth 58 extending radially inwardly from the plate inner surface 54a and providing at least one angular displacement sensor 20. Most preferably, the second plate 54 has four pairs of the projection/teeth 58 spaced apart about the axis $A_C$ and each disposed axially adjacent to a separate one of the four projection pairs providing the four preferred reference sensors 18.

Referring specifically to FIG. 15, each inductive sensor 26 preferably includes one pair of the projections/teeth 58, which provide first and second core members 62, 64, and further includes first and second electric coils 66, 68. Each core member 62, 64 has a free inner end 62a, 64a and an opposing outer end 62b, 64b connected with the base member main annular plates 52, 54, respectively. The core outer ends 62b, 64b are preferably integrally formed with the annular plates 52, 54, as described above, but may alternatively be provided by a separate elongated member or bar (none shown) attached to one of the annular plates 52, 54 by any appropriate means (e.g., welding, fasteners, etc.). With the two preferred core members 62, 64, each sensor inner end 16a, 18a or 20a which senses the target body 12 or the position indicator 14 is provided by two spaced-apart core ends 62a, 64a, such that each sensor 16, 18, 20 detects ferromagnetic material within a magnetic flux path extending between the core ends 62a, 64a, as described below.

Figure 17:
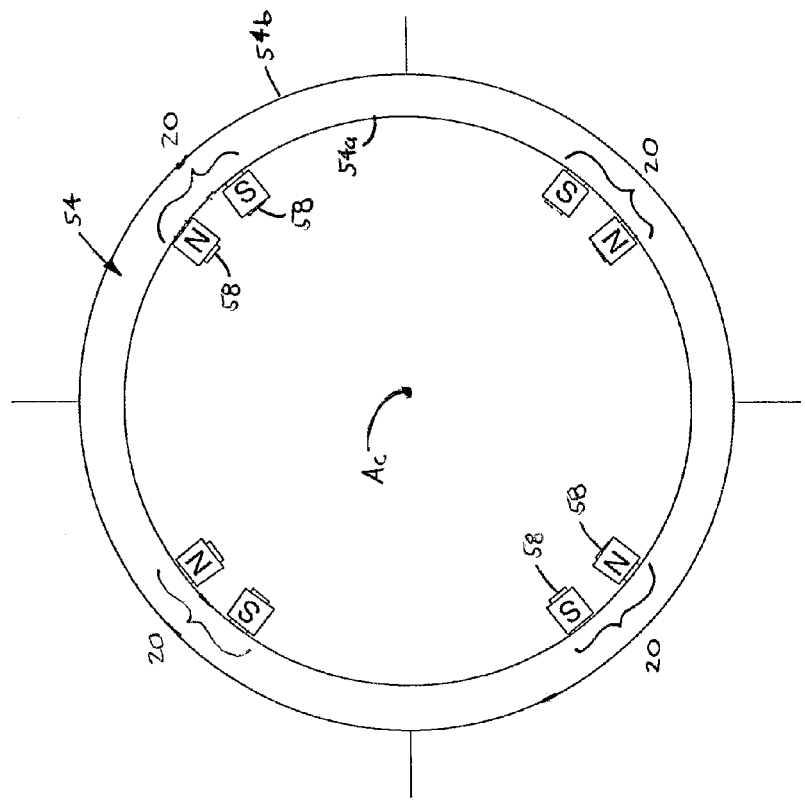
FIG. 17 is a more diagrammatic view of a second base plate showing the magnetic pole arrangements of the preferred angular displacement sensors.
Figure 16:
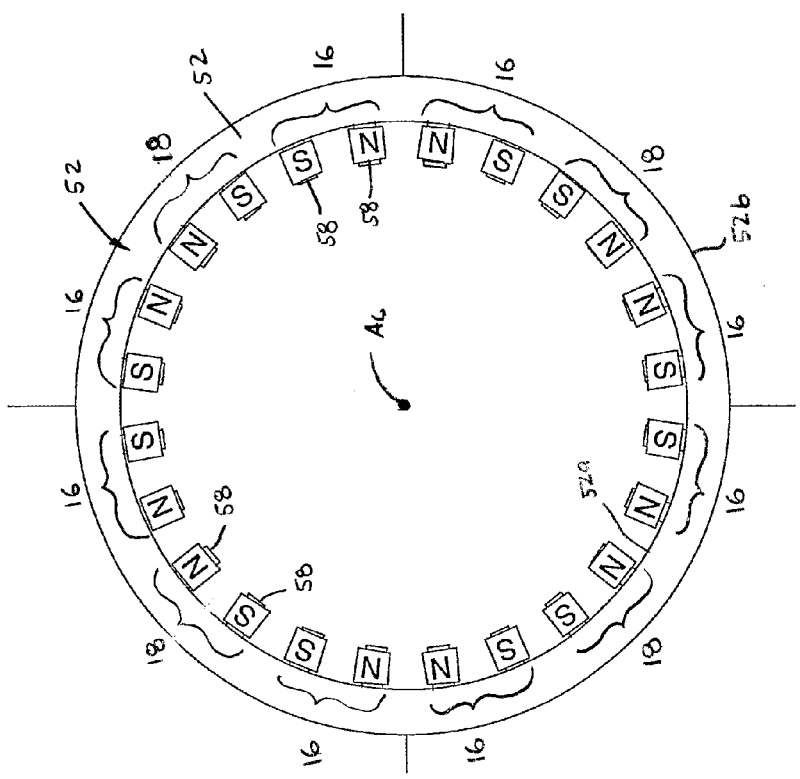
FIG. 16 is more diagrammatic view of a first base plate showing the magnetic pole arrangements of the preferred radial displacement and reference sensors.
Figure 18:
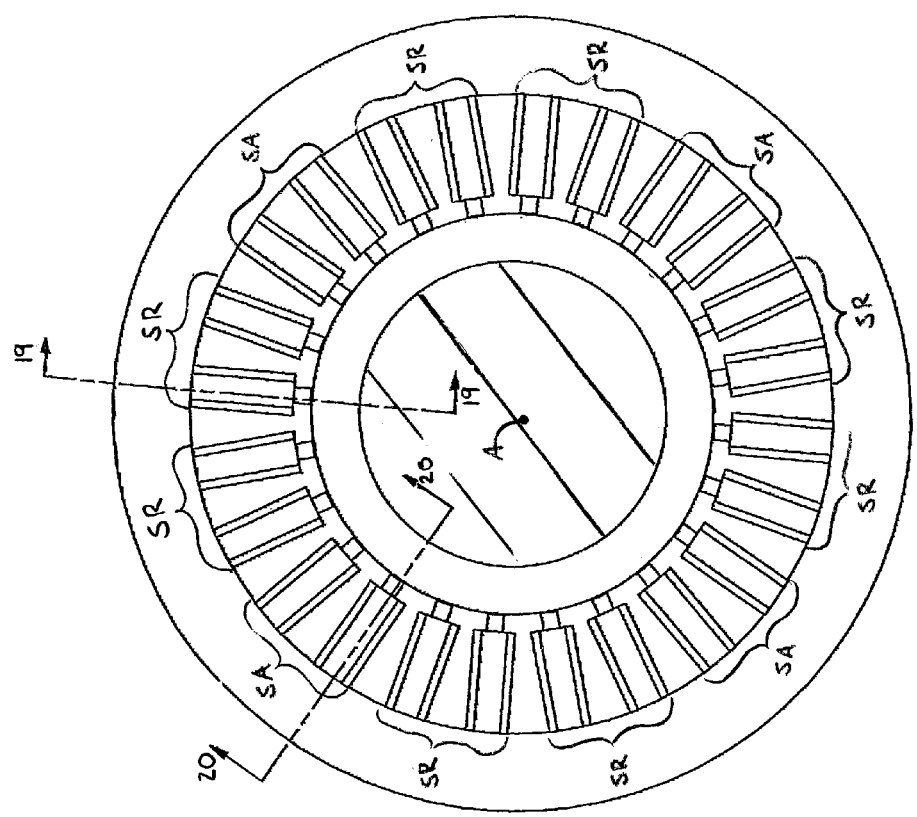
FIG. 18 is front plan view of a prior art sensor assembly for sensing radial and axial displacement of a shaft.
Figure 19:
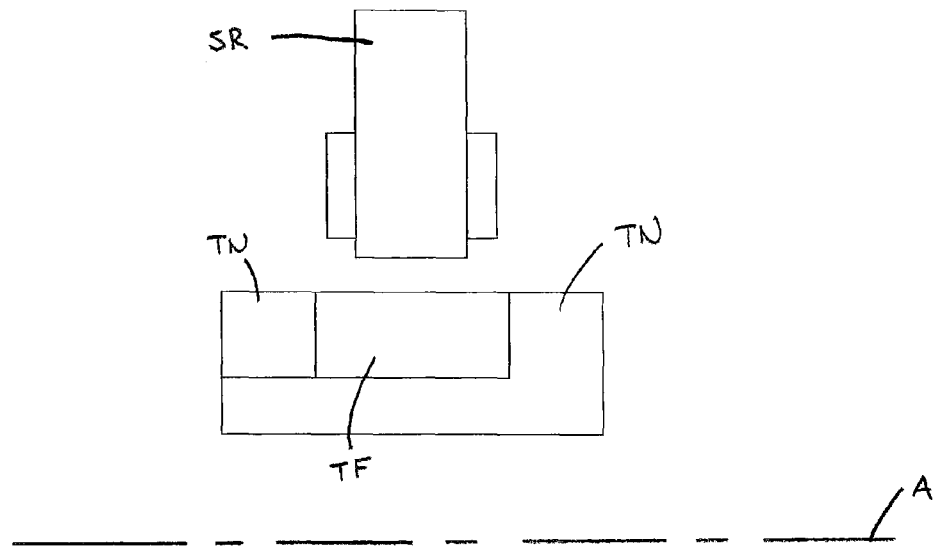
FIG. 19 is an axial cross-sectional view through line 19-19 of FIG. 18.
Figure 20:
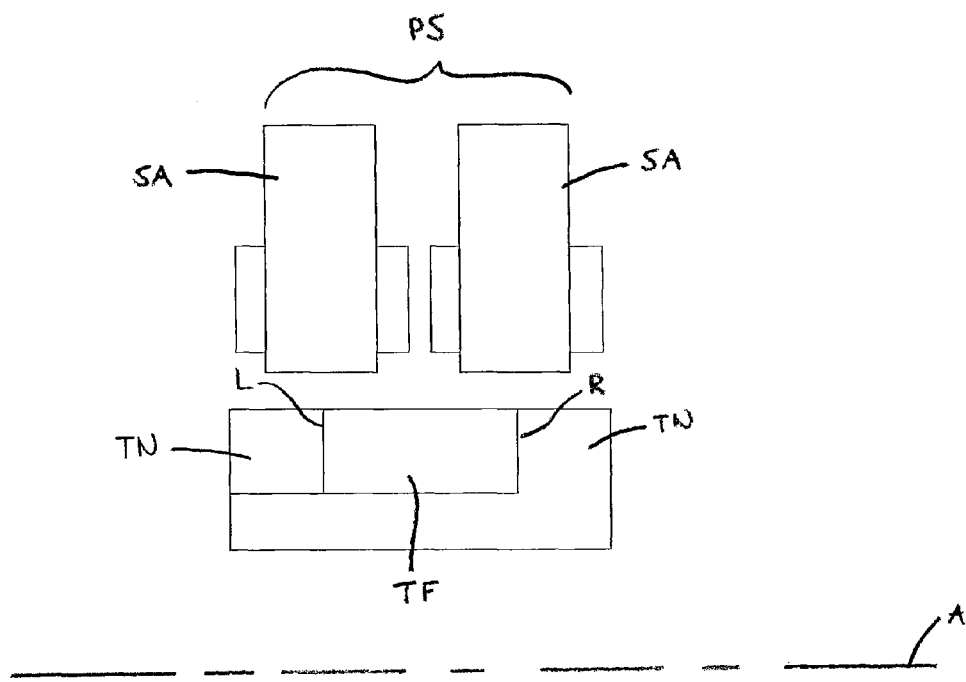
FIG. 20 is an axial cross-sectional view through line 20-20 of FIG. 18.
Figure 21:
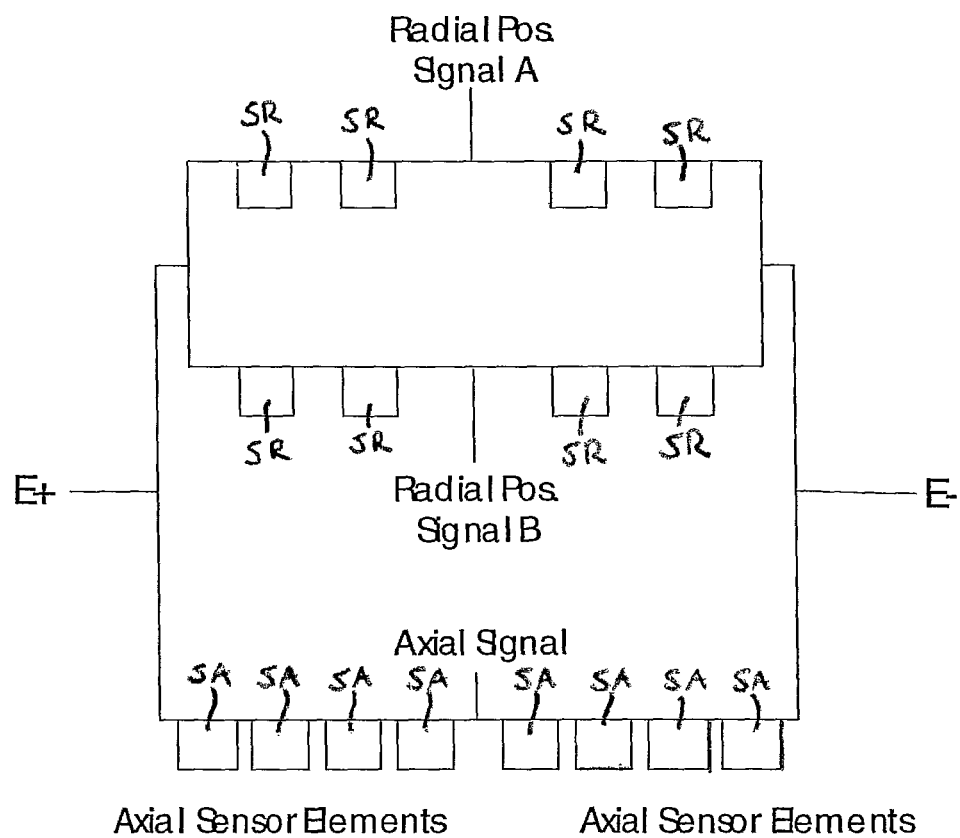
FIG. 21 is a schematic diagram of certain electronic components of the prior art sensor assembly of FIG. 18.

Still referring to FIG. 14, each first electric coil 66 is wound about the first core member 62 and each second electric coil 68 is wound about the second core member 64, both of the first and second coils 66, 68 being electrically connected with the same oscillator circuit 30, 32 depending whether the particular sensor is a reference sensor 18 or angular displacement sensor 20. The oscillator circuit 30 or 32 provides alternating current (AC) to each connected coil 66, 68 and the coils 66, 68 are configured or arranged such that, when the current flows through each one of the coils 66 or 68, the resulting magnetic flux extends out of the first core inner end 62a and into the second core inner end 64a. The magnetic flux further extends out of the second core outer end 64b, through a portion of the base plate 52 or 54 and into the first core outer end 62b, such that the entire flux path in each sensor is generally circuitous or closed. Thus, if the current were direct current (DC), which simplifies the conceptualization of the flux path, the core member 62 and coil 66 would provide a north pole and the second core member 64 and coil 68 would provide a south pole for sensing ferromagnetic material of the target body 12 or the angular position indicator 14, as indicated in FIGS. 16 and 17. However, because the current is AC, in practice, rather than north and south poles, the core members 62, 64 and coils 66, 68 provide poles that are positively and negatively excited by the oscillator circuits 30, 32.

Although preferably formed as a U-shaped inductive sensor integrally formed with a common base member or plate, each sensor 16, 18 and 20 of the sensor assembly 10 may be formed in any other appropriate manner that enables the assembly 10 to function generally as described herein. For example, the two core members 62, 64 may be provided by separate members attached to a base plate 52 or 54, as discussed above, or each sensor 16, 18 and/or 20 may include only a single core member (not shown), whether integrally formed or separately attached. Further, each sensor 16, 18 and/or 20 may be formed as another type of sensor, such as for example, a Hall Effect sensor, a capacitive sensor, etc. The sensor assembly 10 may be constructed with these or any other appropriate sensors which enable the assembly 10 to function generally as described herein.

As shown in FIGS. 1, 4, 5, 8-10, 16 and 17, the sensor assembly 10 preferably includes a plurality of the reference sensors 18 and a plurality of the angular displacement sensors 20, spaced circumferentially about the central axis $A_C$. Each reference sensor 18 is disposed circumferentially between a separate pair of proximal radial position sensors 16 and each angular displacement sensor 20 is spaced axially from a separate one of the reference sensors 18. Most preferably, the sensor assembly 10 includes four pairs 21 of the reference sensors 18 and the angular displacement sensors 20, each sensor pair 21 being located within a separate quadrant of the sensor assembly 10, as shown in FIGS. 1, 4, 5, 8-10, 16 and 17. Each sensor pair 21 may be connected, through a separate bridge circuit 34, with a separate one of a plurality of processors 42, such that the sensor assembly 10 has a redundancy of separately calculated measurements (e.g., speed, angular displacement, etc.). Alternatively, all of the sensors 18, 20 may be connected with a single processor 42, in which case the single processor 42 receives multiple pulses (i.e., four pulses) per revolution of the rotatable member 1.

Furthermore, the angular position indicator 14 may include a plurality of position indices 22 spaced circumferentially about the central axis $A_C$, each index 22 corresponding to a separate angular position $\theta_n$ of the rotatable member 1 about the central axis $A_C$ (structure not depicted). For example, the position indicator 14 may include four gaps or nonferromagnetic portions spaced about ninety degrees apart about the central axis $A_C$, in which case the processor 42 receives four pulses $S_P$ per revolution of the rotatable member 1. The multiple position indices 22 may be sensed by a single angular displacement sensor 20 or multiple sensors 20 to provide a redundancy of separately calculated measurements (i.e., speed, etc.), which can be compared, averaged, etc. to increase precision of the sensor assembly 10.

Furthermore, using multiple pulses and/or uneven spacing of the reference and angular position sensor pairs 18, 20 (i.e., separating them by angular intervals slightly different from the ninety degree (90°) separation depicted as the preferred embodiment), will aid in the sensing of the direction of rotation, and in the sensing of angular position between pulses.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A sensor assembly for sensing radial position and speed of a rotatable member, the member being rotatable about a central axis and having an outer surface extending circumferentially about the axis, the sensor assembly comprising:
   a generally annular target body disposed about the rotatable member outer surface and having a substantially continuous outer circumferential surface;
   a generally annular angular position indicator having an outer circumferential surface and at least one angular position index corresponding to a particular angular position of the member with respect to the central axis, the angular position indicator being one of integrally formed with the target body and spaced axially from the target body;
a plurality of radial position sensors spaced circumferentially about the axis, each sensor being spaced radially outwardly from the target body outer surface and configured to sense radial displacement of the target body with respect to the central axis;
a reference sensor disposed circumferentially between two of the radial position sensors, having an inner end spaced radially outwardly from the target body outer surface by a first spacing distance, and configured to detect the target body; and
an angular displacement sensor spaced axially from the reference sensor and having an inner end spaced radially outwardly from the angular position indicator outer surface by a second spacing distance, the displacement sensor being located such that the second spacing distance is generally equal to the first spacing distance and such that the angular position index passes between the displacement sensor inner end and the central axis during rotation of the rotatable member.

2. The sensor assembly as recited in claim 1 wherein the angular position indicator includes an generally annular body formed of a ferromagnetic material and having one of an arcuate gap providing the index and a generally arcuate portion formed of a nonferromagnetic material providing the index.

3. The sensor assembly as recited in claim 1 wherein:
the reference sensor is configured to generate an output signal proportional to the first spacing distance; and
the angular displacement sensor is configured to generate an output signal generally proportional to the second spacing distance, a pulse in the displacement sensor output signal being formed when the position index passes between the displacement sensor inner end and the central axis during rotation of the rotatable member.

4. The sensor assembly as recited in claim 3 further comprising:
a first oscillator circuit electrically connected with the reference sensor and configured to provide a first input signal to the reference sensor;
a second oscillator circuit electrically connected with the angular position sensor and configured to provide a second input signal to the angular displacement sensor, the second signal being about one hundred eighty degrees out-of-phase of the first signal; and
an interconnection electrically connected with the reference sensor and with the angular displacement sensor so as to receive the output signals from each one of the two sensors, the interconnection being configured such that the output signals from the two sensors cancel each other when the first spacing distance is generally equal to the second spacing distance and configured to transmit an output signal when receiving a pulse from the angular position sensor.

5. The sensor assembly as recited in claim 4 wherein the interconnection includes a first wire electrically coupled with the reference sensor and receiving the first signal, a second wire connected with the angular displacement sensor and receiving the second signal and a third wire connected with each one of the first and second wires and receiving both of the first and second signals.

6. The sensor assembly as recited in claim 4 further comprising a processor electrically coupled with the interconnection so as to receive input from the circuit and configured to determine at least one of angular position of the rotatable member and speed of the rotatable member.

7. The sensor assembly as recited in claim 6 wherein each one of the radial position sensors is electrically coupled with the processor and the processor is configured to determine radial displacement of the rotatable member using output from the radial position sensors.

8. The sensor assembly as recited in claim 1 wherein each one of the reference sensor and the angular displacement sensor is an inductive sensor.

9. The sensor assembly as recited in claim 8 wherein:
each inductive sensor includes first and second pole members each having an inner end, a first electric coil wound about the first pole member and a second electric coil wound about the second pole member; and
the sensor assembly further comprises an oscillator circuit electrically connected with each one of the first and second coils so as to provide current to each coil, the coils being configured such that magnetic flux extends out of the first pole member inner end and into the second pole member inner end when current flows through each one of the two coils.

10. The sensor assembly as recited in claim 8 further comprising a first oscillator circuit electrically connected with the reference inductive sensor and a second oscillator circuit electrically connected with the angular displacement inductive sensor, each oscillator circuit being configured to provide an input signal to each inductive sensor such that each sensor generates a separate output signal.

11. The sensor assembly as recited in claim 1 wherein the angular position indicator includes a plurality of position indices spaced circumferentially about the central axis, each index corresponding to a separate angular position of the rotatable member about the central axis.

12. The sensor assembly as recited in claim 1 wherein the sensor assembly includes:
a plurality of reference sensors spaced circumferentially about the central axis, each reference sensor being disposed circumferentially between a separate pair of proximal radial position sensors, having an inner end spaced radially outwardly from the target body outer surface by the first spacing distance and configured to detect the target body; and
a plurality of angular displacement sensors spaced circumferentially about the central axis, each angular displacement sensor spaced axially from a separate one of the reference sensors and having an inner end spaced radially outwardly from the angular position indicator outer surface by the second spacing distance, each displacement sensor being located such that the angular position index passes between the displacement sensor inner end and the central axis during rotation of the rotatable member and such that the second spacing distance is generally equal to the first spacing distance.

13. A sensor assembly for sensing radial position and speed of a shaft rotatable about a central axis, the sensor assembly comprising:
a plurality of radial position inductive sensors spaced circumferentially about the axis, each radial position sensor being spaced radially outwardly from the shaft and configured to sense radial displacement of the shaft with respect to the central axis;
a reference inductive sensor disposed circumferentially between two of the radial position sensors and having an inner end spaced radially outward from a target surface extending circumferentially about the central axis, the target surface being provided by one of the shaft and an annular indicator body disposed on the shaft;

an angular position index provided by one of the shaft and an annular position indicator disposed about the shaft; and an angular displacement inductive sensor spaced axially from the reference sensor and having an inner end, the displacement sensor being located such that a radial spacing distance between the angular displacement sensor inner end and an outer surface of one of the shaft and the annular indicator body is about equal to a radial spacing distance between the reference sensor inner end and the target surface and such that that the angular position index passes generally between the angular displacement sensor inner end and the central axis during rotation of the shaft.

14. The sensor assembly as recited in claim 13 wherein the sensor assembly includes:

a generally annular target body disposed about the rotatable member outer surface and having a substantially continuous outer circumferential surface providing the target surface; and a generally annular angular position indicator coupled with the rotatable member, spaced axially from the target body and having an outer circumferential surface and providing the angular position index, the position indicator being one of separate from the target body and integrally formed with the target body.

15. The sensor assembly as recited in claim 13 further comprising:

a first oscillator circuit electrically connected with the reference sensor and configured to provide a first input signal to the reference sensor;

a second oscillator circuit electrically connected with the angular position sensor and configured to provide a second input signal to the angular displacement sensor, the second signal being about one hundred eighty degrees out-of-phase of the first signal; and an interconnection electrically connected with the reference sensor and with the angular displacement sensor so as to receive the output signals from each one of the two sensors, the interconnection being configured such that the output signals from the two sensors cancel each other when the first spacing distance is generally equal to the second spacing distance and configured to transmit an output signal when receiving a pulse from the angular position sensor.

16. The sensor assembly as recited in claim 13 wherein the target surface and the position indicator are provided by the rotatable member.

* * * * *